(12) United States Patent
Suzuki

(10) Patent No.: US 7,044,856 B2
(45) Date of Patent: May 16, 2006

(54) GAME DEVICE, PROGRAM, AND METHOD FOR SEQUENTIALLY CHANGING GAME IMAGES OVER TIME

(75) Inventor: Eiji Suzuki, Tokyo (JP)

(73) Assignees: Konami Corporation, Tokyo (JP); Konami Computer Entertainment Tokyo, Inc., Tokyo (JP)

(*) Notice: Subject to any disclaimer, the term of this patent is extended or adjusted under 35 U.S.C. 154(b) by 83 days.

(21) Appl. No.: 10/802,730

(22) Filed: Mar. 18, 2004

(65) Prior Publication Data

US 2004/0204211 A1  Oct. 14, 2004

(30) Foreign Application Priority Data

Mar. 19, 2003  (JP)  ............................ 2003-076370

(51) Int. Cl.
*A63F 13/00* (2006.01)

(52) U.S. Cl. ...................................... 463/31

(58) Field of Classification Search ............ 463/31–34, 463/4

See application file for complete search history.

(56) References Cited

U.S. PATENT DOCUMENTS 6,146,278 A * 11/2000 Kobayashi ................. 463/53
6,887,157 B1 * 5/2005 LeMay et al. .............. 463/32

FOREIGN PATENT DOCUMENTS

JP  2001-347074 A  12/2001
JP  2003-299880 A  10/2003

OTHER PUBLICATIONS

Dengeki Oct. 2002 No. 143, vol. 10, No. 12, whole No. 43, Media Works, Oct. 10, 2002, p. 160.
Dengeki PlayStation vol. 180, vol. 7, No. 17, whole No. 176, Media Works, Jun. 22, 2001, p. 162 to 163.

* cited by examiner

*Primary Examiner*—Kim Nguyen
(74) *Attorney, Agent, or Firm*—Sughrue Mion, PLLC

(57) ABSTRACT

A game device for adjusting the progress rate of simulation with the use of a conventional program module for environmental processing is provided. In the game device, a microprocessor (14) selectively performs, in accordance with a game operation provided by a player of a game, either a process for producing environment information which is a basis for a game image of the subsequent predetermined update cycle, and producing a main game image based on the environment information, or a process for repeatedly producing the environment information plural times, and producing a sub game image based on the last produced environment information among the information produced plural times in a shorter time than the main game image.

5 Claims, 5 Drawing Sheets

GAME DEVICE, PROGRAM, AND METHOD FOR SEQUENTIALLY CHANGING GAME IMAGES OVER TIME

BACKGROUND OF THE INVENTION

The present invention relates to a game device for sequentially changing a game image over the course of time.

Conventional sports games include those allowing a game player (hereinafter referred to as a "gamer") to supervise the formation of field players (hereinafter referred to simply as "players") and the like in the game as a manager of a team rather than directly manipulating each player. In such a game, a computer runs a simulation based on the game parameter set for each player, and determines the result of the game.

The computer advances the simulation with the course of time, and sequentially updates the game image. While referring to the game image, the gamer performs game operations such as inputting an instruction to a player, changing players, and so on.

For the above-described type of conventional games, it is desired to achieve such that the gamer speeds up progress of the simulation when he/she is generally satisfied with each player's play, and set back the simulation to the normal speed when the game is about to reach the most interesting part or when he/she wants to give an instruction to a certain player with precise timing.

In conventional games, however, the process for producing a three-dimensional image is associated with a heavy load, and is time consuming. As a result, the process for advancing the simulation (environmental processing) can be performed only once in every vertical blanking period, and the progress speed of the simulation can be controlled only by increasing the time step advanced by one environmental process. In other words, the program module for environmental processing must be rewritten.

SUMMARY OF THE INVENTION

The present invention has been conceived in view of the above-described circumstances, and an object thereof is to provide a game device capable of adjusting the time step to the next game image, such as the progress speed of the simulation, and calculating the environment information advanced by the adjusted time step with the use of conventional program modules for environmental processing.

In order to solve the above-described problems of the conventional art, a game device for updating a game image every predetermined update cycle according to one aspect of the present invention comprises environment information production means for producing environment information which is a basis for the game image of the subsequent update cycle, main game image production means for producing a main game image based on the environment information, sub game image production means for producing a sub game image by a process to be finished within shorter times than times for producing the main game image, sub game image display process control means for causing the environment information production means to repeatedly produce the environment information a plurality of times in a continuous manner within a predetermined period appearing every update cycle, causing the sub game image production means to produce the sub game image based on the last produced environment information among the information produced the plurality of times, and performing a sub game image display process for displaying the sub game image as the game image, main game image display process control means for causing the environment information production means to produce the environment information within the predetermined period appearing every update cycle, causing, every time the environment information is produced, the main game image production means to produce the main game image based on the produced environment information, and performing a main game image display process for displaying the main game image as the game image, and control means for selectively causing either the sub game image display process control means or the main game image display process control means to perform the process based on a predetermined condition. A predetermined condition may be a condition in accordance with the user's operation, a condition related to development of the game, or a condition related to the state of the processing load.

Thus, for increasing the number of times the environment information is updated, a sub game image is produced and displayed instead of a main game image, thereby reducing time required for production of the game image and allowing repeated execution of the environmental processing. As a result, the time step to the next game image can be adjusted and the environment information advanced by the adjusted time step can be calculated with the use of conventional program modules for environmental processing, thereby adjusting progress rate of the simulation.

The predetermined update cycle may be a cycle of a vertical blanking period, and the predetermined period may be a vertical blanking period. In this case, the device may further include supervisory means for supervising a remaining time of the vertical blanking period, and the sub game image display process control means may cause the environment information production means to repeatedly produce three-dimensional environment information in a continuous manner until the remaining time of the vertical blanking period monitored by the monitor means reaches a predetermined time.

A game control method according to another aspect of the present invention solving the above-described problems of the conventional art is a game control method of causing a computer to run a game updating a game image every predetermined update cycle, wherein, in accordance with a game operation provided by a player of the game, the computer selectively performs one of the steps of: producing environment information which is a basis for a game image of the subsequent update cycle within a predetermined period appearing every update cycle, producing, every time the environment information is produced, a main game image based on the produced environment information, and displaying the main game image as the game image; and repeatedly producing the environment information which is a basis for the game image of the subsequent update cycle a plurality of times in a continuous manner within the predetermined period appearing every update cycle, producing a sub game image based on the last produced environment information among the information produced the plurality of times, and displaying the sub game image as the game image.

A game control program according to a further aspect of the present invention solving the above-described problems of the conventional art is a game control program for causing a computer to run a game updating a game image every predetermined update cycle, the game control program causing performance of a first procedure of producing environment information which is a basis for a game image of the subsequent update cycle within a predetermined period appearing every update cycle, producing, every time the environment information is produced, a main game image based on the produced environment information, and displaying the main game image as the game image, a second procedure of repeatedly producing the environment information which is a basis for the game image of the subsequent update cycle a plurality of times in a continuous manner within the predetermined period appearing every update cycle, producing a sub game image based on the last produced environment information among the information produced the plurality of times, and displaying the sub game image as the game image, and a control procedure of causing the computer to selectively perform one of the first and second procedures in accordance with a game operation provided by a player of the game.

DESCRIPTION OF THE PREFERRED EMBODIMENT

Figure 1:
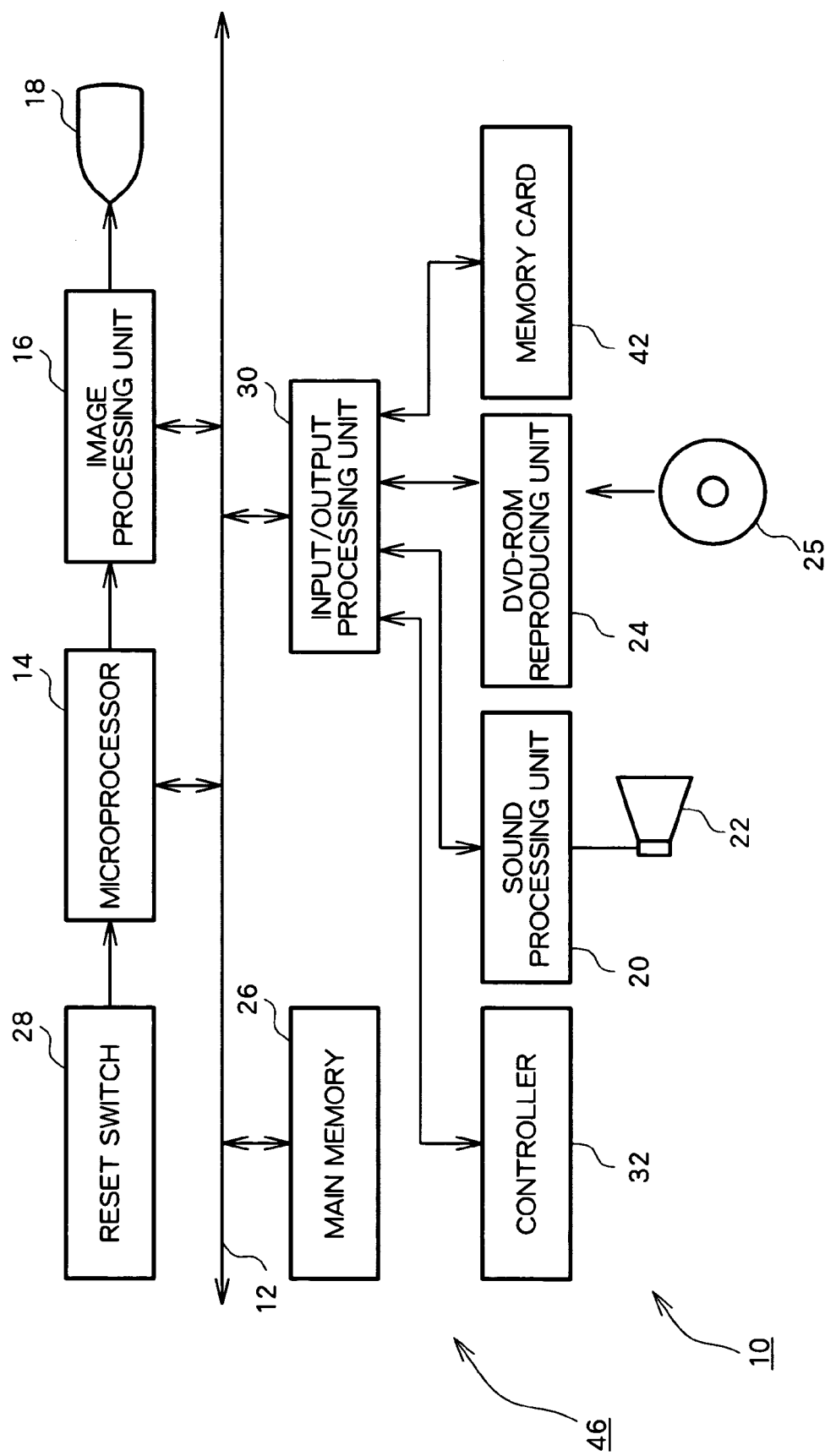
FIG. 1 is a block diagram showing an architecture of a game device according to an embodiment of the present invention.

An exemplary embodiment of the present invention will now be described with reference to the drawings. Referring to FIG. 1, a game device according to one embodiment of the present invention is implemented by a home-use game machine 46 connected to a monitor 18 and a speaker 22, and a DVD-ROM 25 and a memory card 42, which are information storage media, mounted in the machine, and the monitor 18 and the speaker 22 are connected. A home TV receiver and a speaker incorporated therein are used as the monitor 18 and the speaker 22, respectively. While the DVD-ROM 25 is used for supplying a program to the home-use game machine 46 in this embodiment, any other information storage media, such as a CD-ROM and a ROM card, can be employed. Alternatively, the program can be remotely supplied to the home-use game machine 46 through a data communication network such as the Internet as described hereinafter.

The home-use game machine 46 is a well-known computer game system including a microprocessor 14, an image processing unit 16, a main memory 26, an input/output processing unit 30, a sound processing unit 20, a reset switch 28, a controller 32, and a DVD-ROM reproducing unit 24. The microprocessor 14, the image processing unit 16, the main memory 26, and the input/output processing unit 30 are interconnected via a bus 12 for data exchange, and the controller 32, the sound processing unit 20, the DVD-ROM reproducing unit 24, and the memory card 42 are connected to the input/output processing unit 30. The components of the home-use game machine 46 are accommodated in a housing except for the controller 32. Note that a home TV receiver and a speaker incorporated therein may be used as the monitor 18 and the speaker 22, respectively.

The microprocessor 14 controls respective elements of the home-use game machine 46 based on the operating system stored in ROM (not shown), the program is read from the DVD-ROM 25, and saved data read from the memory card 42, and provides the gamer with a game. The bus 12 is used for exchanging addresses and data among the elements of the home-use game machine 46. When the reset switch 28 is pressed, the microprocessor 14 halts the ongoing process, and starts an initializing process.

The main memory 26 includes, for example, a RAM used for storing the program read from the DVD-ROM 25 and then saved data from the memory card 42 as necessary, and also used as work areas for the microprocessor 14. The image processing unit 16 including a VRAM receives image data from the microprocessor 14 to draw a game image in the VRAM, and converts the content into video signals, which are output to the monitor 18. When the reset switch 28 is pressed, the content of the main memory 26 is initialized.

The input/output processing unit 30 is an interface for allowing the microprocessor 14 to access the controller 32, the sound processing unit 20, the DVD-ROM reproducing unit 24, and the memory card 42. The sound processing unit 20 including a sound buffer reproduces various sound data for game music, a game effect sound, a message, and so on, which are read from the DVD-ROM 25 and stored in the sound buffer, and outputs sound with the speaker 22. The DVD-ROM reproducing unit 24 reads the program stored in the DVD-ROM 25 in accordance with an instruction from the microprocessor 14. The controller 32 is multipurpose operation input means for allowing a gamer to input various game operations. The memory card 42 including a nonvolatile memory (such as an EEPROM) is detachably inserted into the home-use game machine 46, and stores saved data for various games and the like. The content stored in the memory card 42 is maintained even after the reset switch 28 is pressed.

Figure 2:
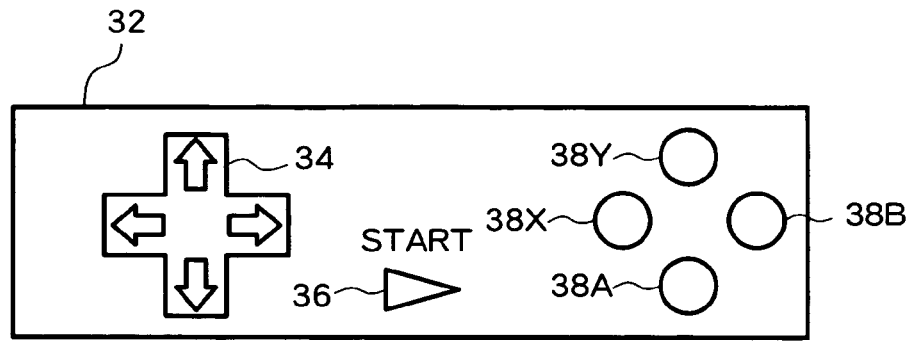
FIG. 2 is a view showing an exemplary controller.

FIG. 2 shows an exemplary controller 32. The controller 32 shown in this figure is a multipurpose game controller which includes a direction key 34, a start button 36, and buttons 38X, 38Y, 38A, and 38B. The direction key 34 in the shape of a cross is usually used for specifying the moving direction of a character or a cursor. The start button 36 is a small triangular push button used for starting a game and forcing termination thereof. The buttons 38X, 38Y, 38A, and 38B are used for other game operations. For the game described below (a soccer simulation game), the direction key 34 and the button 38B are used for menu selection and choice making, respectively.

The game process performed with the hardware constructed as described above will be described further in detail, taking as an example implementation of a soccer simulation game.

Unlike common soccer games, this soccer simulation game allows a gamer to play as a manager, not as a player. More specifically, the gamer assumes the role of manager of a certain team and manages the team in some tournaments including several match simulations with other teams, striving for the title of Japan or World champions. The gamer performs operations such as giving instructions to players as to how to attack or defend during a match, and replacing an idle player with another player, and strives for the title of Japan or World champions.

Figure 3:
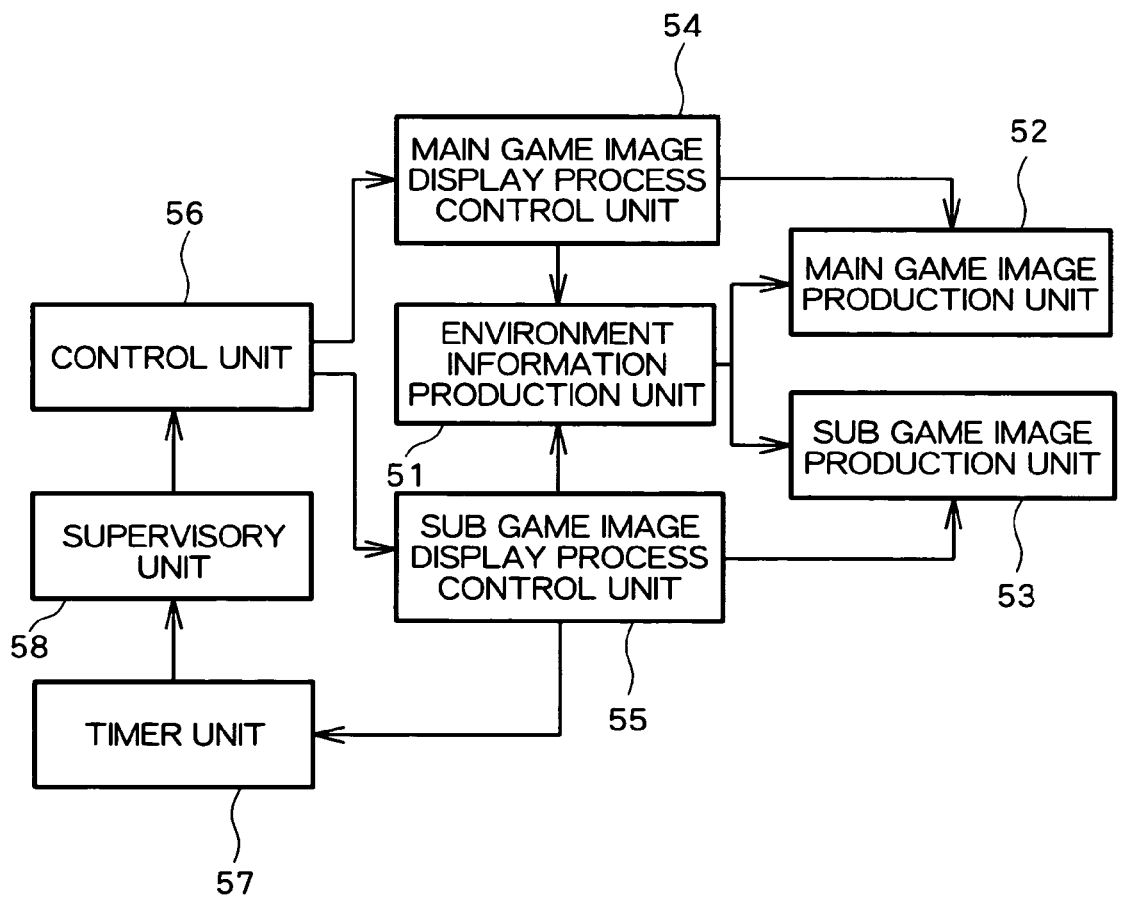
FIG. 3 is a functional block diagram showing an exemplary game device according to the embodiment of the present invention.

FIG. 3 is a functional block diagram of the game device according to the present embodiment. A game device 10 of the present embodiment allows a gamer to play a game in which a game image is updated every predetermined update cycle (hereinafter referred to simply as an "update cycle"). Functionally, the device includes an environment information production unit 51, a main game image production unit 52, a sub game image production unit 53, a main game image display process control unit 54, a sub game image display process control unit 55, a control unit 56, a timer unit 57, and a supervisory unit 58, as illustrated in FIG. 3. These functional blocks and a control unit (not shown) controlling the blocks are implemented by the microprocessor 14 running the program stored in the DVD-ROM 25. Note that the update cycle is determined based on, for example, a signal repeatedly appearing with predetermined timings, and it is assumed in this embodiment that the update cycle is a cycle in which a vertical blanking period appears.

The environment information production unit 51 performs a process (environmental processing) for producing the environment information for the subsequent update cycle from the previously calculated environment information which is the basis for a game image in accordance with an instruction input from the main game image display process control unit 54 or the sub game image display process control unit 55 as described later. More specifically, the environment information is information as to the position (location and posture) of the objects provided in the virtual three-dimensional space such as the positions of each player, and the ball, and the environment information production unit 51 produces information for producing a game image intended for display in the subsequent update cycle.

Figure 4:
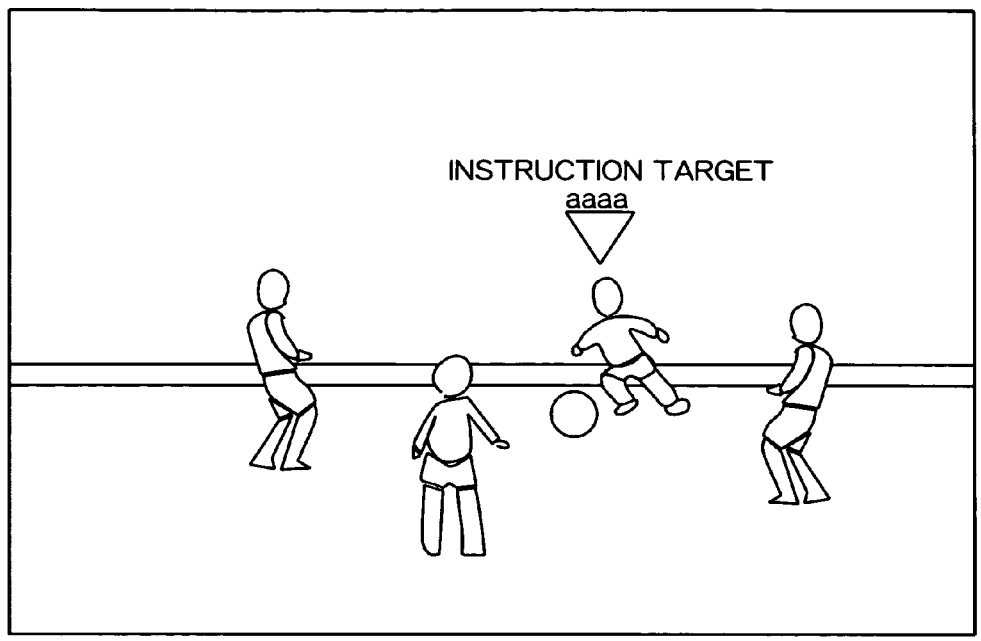
FIG. 4 is a view showing an exemplary main game image.

The main game image production unit 52 produces image data for a main game image based on the environment information produced by the environment information production unit 51 when an instruction to produce a game image is input from the main game image display process control unit 54 described hereinafter. More specifically, the image data for the main game image is the image data generated by a three-dimensional process, i.e. the data for representing images of each player and the ball disposed in the virtual three-dimensional space as viewed from a certain point in the space, as illustrated in FIG. 4.

Figure 5:
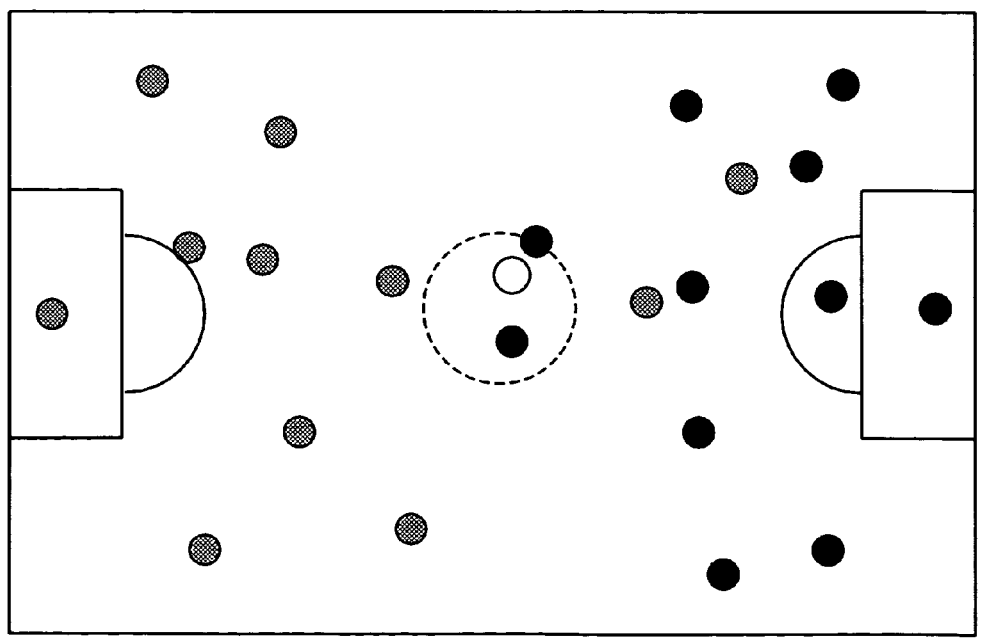
FIG. 5 is a view showing an exemplary sub game image.

The sub game image production unit 53 produces image data for a sub game image based on the environment information produced by the environment information production unit 51 when an instruction to produce a game image is input from the sub game image display process control unit 55 described hereinafter. More specifically, the image data for the sub game image is the image data generated by a two-dimensional process, i.e. the data for simply representing each player and the ball as a disk, for example, projected onto the ground as viewed from the top rather than producing a detailed image of each player, as illustrated in FIG. 5. Therefore, the sub game image production unit 53 finishes the process in shorter times (short enough, for example, to perform the environmental processing twice or more in the time remaining after the time required for the sub game image production is subtracted from the vertical blanking period) than the time required for the main game image production.

The main game image display process control unit 54 provides the environment information production unit 51 with an instruction to produce the environment information within a predetermined period appearing every update cycle. When the environment information is produced, the main game image display process control unit 54 provides the main game image production unit 52 with an instruction to produce a main game image based on the produced environment information, and displays the main game image as a game image.

When the update cycle comes, the sub game image display process control unit 55 instructs the timer unit 57 to start measuring a predetermined period, and the supervisory unit 58 to monitor the time measured by the timer unit 57. The sub game image display process control unit 55 repeatedly provides the environment information production unit 51 with an instruction to produce the environment information until an announcement signal described hereinafter is input from the supervisory unit 58.

More specifically, the sub game image display process control unit 55 causes repeated production of the environment information successively a number of times for a certain period to advance the simulation continuously. For example, assuming that the update cycle is denoted as $\Delta t$, production of the environment information repeated "n" times yields the environment information advanced by the period of $n \times \Delta t$.

When the announcement signal is input from the supervisory unit 58, the sub game image display process control unit 55 provides the sub game image production unit 53 with an instruction to produce a sub game image based on the last piece of the environment information among the information produced plural of times. The sub game image display process control unit 55 then displays the produced sub game image as a game image.

The control unit 56 selectively causes either the sub game image display process control unit 55 or the main game image display process control unit 54 to perform the process in accordance with predetermined conditions, such as a game operation of the gamer. More specifically, when the gamer gives an instruction to speed up progress of the simulation, the control unit 56 instructs the sub game image display process control unit 55 to perform the process. When the gamer gives an instruction to advance the simulation in a normal speed, the control unit 56 instructs the main game image display process control unit 54 to perform the process. In other words, when the gamer operates to speed up progress of the simulation, the control unit 56 causes the sub game image display process control unit 55 to initiate the process for sequentially updating and displaying the simplified game image subject to the two-dimensional process advanced by an extended period of plural times as long as the update cycle. When the gamer operates to advance the simulation in the normal speed, the control unit 56 causes the main game image display process control unit 54 to initiate the process for sequentially updating and displaying the normal game image subject to the three-dimensional process for the subsequent update cycle.

The timer unit 57 measures the time for a predetermined period (such as a vertical blanking period) appearing every update cycle. More specifically, the timer unit 57 is a subtractive timer for setting the time corresponding to the vertical blanking period in a register when instructed to initiate measurement, and keeps decreasing the value of the register down to zero with the course of time. The supervisory unit 58 supervises the time measured by the timer unit 57, and supplies the announcement signal when the measured time meets the predetermined conditions. More specifically, when the timer unit 57 is the subtractive timer as described above, the supervisory unit 58 supplies the announcement signal when the value of the register becomes smaller than a predetermined value. In other words, the supervisory unit 58 supplies the announcement signal when the remaining time of the vertical blanking period reaches a predetermined time. Note that the predetermined value is set corresponding to the time greater than the time required for production of the sub game image. The supervisory unit 58 may also supply the announcement signal upon reception of an instruction from the gamer to advance the simulation at the normal speed.

While the timer unit 57 is instructed by the sub game image display process control unit 55 to initiate measurement in the above description, a register for measuring the vertical blanking period may be supervised as the timer unit 57 by the supervisory unit 58 if such a register is provided in, for example, the image processing unit 16. In this case, the sub game image display process control unit 55 need not give an instruction to initiate measurement.

The game device of the present embodiment constructed as described above operates in the following manner. When a gamer starts a game, a simulation is carried out first at a normal speed. For every time period of Δt, the environment information advanced by the period Δt is produced by the microprocessor 14. In accordance with an instruction input from the microprocessor 14, a game image (main game image) subject to the three-dimensional process as illustrated in FIG. 4 is produced by the image processing unit 16 based on the environment information, and displayed on the monitor 18.

The microprocessor 14 monitors whether or not a game operation instruction is supplied from the controller 32, and performs the environmental processing in accordance with the instructive operation by the gamer.

After a while, when there is a lull in the game and the gamer does not particularly need to give instructions to the players in the simulation, such as when the players are just passing the ball around while watching for a chance, the gamer gives an instruction using the controller 32 to speed up progress of the simulation.

Figure 6:
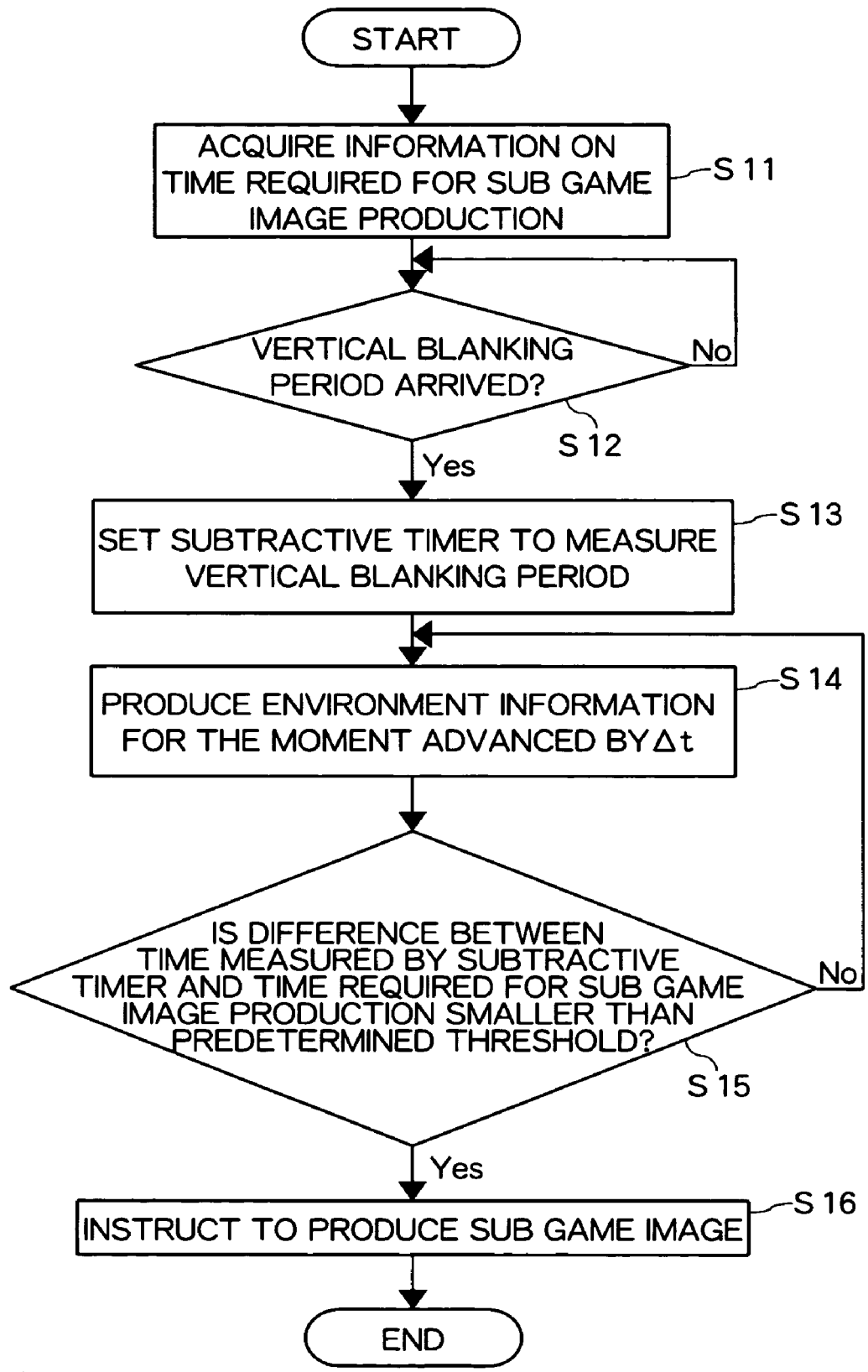
FIG. 6 is a flowchart of an exemplary process for displaying the sub game image performed by the microprocessor 14.

Receiving input of the instructive operation, the microprocessor 14 begins a process for the shifted mode in which simplified representation (display of a sub game image) is initiated, as illustrated in FIG. 6, and first acquires information on time required for production of a sub game image (S11). The microprocessor then determines whether or not (a start timing of) a vertical blanking period has arrived (S12). If the vertical blanking period has not arrived, the process returns to the step S12, and is continued. On the other hand, if it is determined at the step S12 that the vertical blanking period has arrived, the subtractive timer for measuring the vertical blanking period is set and measurement is initiated (S13). This process is performed by the timer unit 57 and the supervisory unit 58.

The microprocessor then produces the environment information for the moment later than the present game scene by Δt (S14), thereby advancing the time of the present game scene by Δt. The microprocessor 14 determines whether or not the difference between the time measured by the subtractive timer and the time acquired at the step S11 is smaller than a predetermined threshold (S15), and, if it is not, the process returns to the step S14, and is continued.

The time for producing a sub game image is generally shorter than the time for producing a main game image, and therefore the time required for the sub game image production remains even after performing the environmental-processing a plurality of times in a vertical blanking period. Accordingly, the environment information is repeatedly produced plural times ("n" times, for example) in a continuous manner by the above-described steps S14 and S15 until the vertical blanking period is left just enough to produce the sub game image, thereby producing the environment information of the game scene for the moment later by n×Δt than the moment when the process in FIG. 6 is started.

When the difference between the time measured by the subtractive timer and the time acquired at the step S11 is smaller than the predetermined threshold at the step S15, the microprocessor 14 instructs the image processing unit 16 to produce a sub game image based on the environment information acquired by repeatedly performing the step S14 for the moment later by n×Δt than the game scene of the moment when the process in FIG. 6 is started (S16) to finish the process. The image processing unit 16 causes display of the simply represented game image as illustrated in FIG. 5 on the monitor 18.

The sub game image is a simplified representation in which detailed movement of the players, such as their postures, is not shown, and therefore looks natural and perceived simply as fast movement even when the simulation is accelerated.

When the gamer determines that the game develops into the situation where he/she must give an instruction to the players while watching the simplified representation, the gamer performs an instructive operation to slow down the simulation back to the normal speed. The microprocessor 14 then produces the environment information advanced by Δt for every period of Δt, and causes the image processing unit 16 to produce the game image subject to the three-dimensional process (main game image) as illustrated in FIG. 4 based on the produced environment information, and to display the image on the monitor 18.

Figure 7:
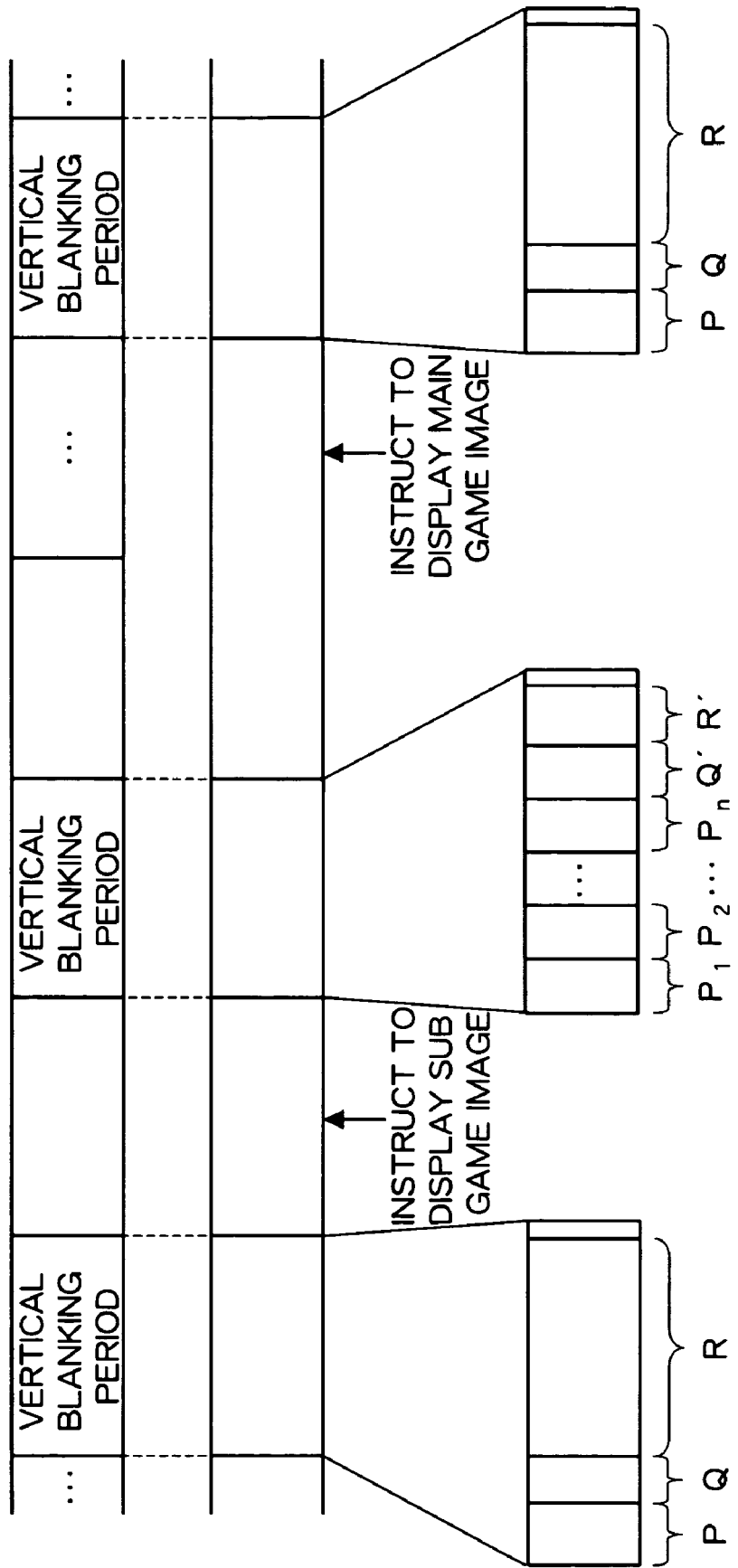
FIG. 7 is a timing chart representing operation timing of the game device of the present embodiment.

FIG. 7 is a timing chart representing operation timing of the game device according to the present embodiment. As illustrated in FIG. 7, the microprocessor 14 performs the environmental processing (P) during the vertical blanking period in the image processing unit 16 while a main game image is displayed. The environmental processing produces various parameters related to the game, i.e. the environment information, such as the position of the ball, and the posture and position of the players. The microprocessor 14 then instructs the image processing unit 16 to produce a main game image based on the environment information (Q), and the image processing unit 16 creates a three-dimensionally processed main game image (R). The time required to produce the main game image accounts for a major share of the vertical blanking period. Therefore, the environmental processing and production of the main game image are each performed only once while the main game image is displayed.

When the gamer performs an instructive operation to shift the display into a sub game image, the microprocessor 14 repeatedly performs the environmental processing a number of times during the vertical blanking period, and the process to display the sub game image based on the result of the environmental processing. More specifically, by repeatedly performing the environmental processing "n" times (P1–Pn), various parameters of the game, i.e. the environment information, such as the positions of the ball and players, and the posture of the players, are produced. The microprocessor 14 then provides the image processing unit 16 with an instruction to produce the sub game image based on the result of the environmental processing repeated "n" times (Q'), and the image processing unit 16 produces the two-dimensionally processed sub game image (R).

When the gamer performs an instructive operation to shift the display into a main game image, the microprocessor 14 performs the environmental processing only once during the vertical blanking period (P), and provides the image processing unit 16 with an instruction to produce the main game image based on the environment information produced by the environmental processing (Q). The image processing unit 16 produces the three-dimensionally processed main game image (R).

If the gamer performs an instructive operation to change the speed of the simulation to normal speed under the circumstances where, judging from movement of the players, the players must be operated immediately to block the opponent from scoring a goal, the simulation advances by the time n×Δt according to the time measured by the timer unit 57 despite the intention of the gamer. However, by causing output of the announcement signal when the supervisory unit 58 receives from the gamer an instruction to slow down the simulation back to the normal speed, the simulation advances only to the circumstances specified by the environment information at the moment the instruction is given (the environment information advanced by m×Δt where m is smaller than n), thereby quickly responding to the gamer's instruction.

As described above, according to the present embodiment, the number of times the environmental processing is performed is adjusted in accordance with the load of producing a number of types of game image, i.e. main and sub game images, thereby balancing the speed of the simulation and the degree of omitting the information to be displayed. In addition, the time step to the next game image is adjusted by the number of times the environmental processing is repeated, thereby allowing the use of conventional program modules for environmental processing.

The present invention is not limited to the above-described embodiment. By way of example, while the program is supplied to the home-use game machine 46 from the information storage medium, i.e. DVD-ROM 25, in the above description, it may be distributed to households and the like through communication networks.

Although a soccer game is described by way of illustration in this specification, the present invention is applicable to games of other types.

What is claimed is:

1. A game device for updating a game image every predetermined update cycle, comprising:
    environment information production means for producing environment information which is a basis for the game image of the subsequent update cycle;
    main game image production means for producing a main game image based on said environment information;
    sub game image production means for producing a sub game image by a process to be finished within shorter times than times for producing said main game image;
    sub game image display process control means for causing said environment information production means to repeatedly produce the environment information a plurality of times in a continuous manner within a predetermined period appearing every said update cycle, causing said sub game image production means to produce the sub game image based on the last produced environment information among the information produced the plurality of times, and performing a sub game image display process for displaying the sub game image as said game image;
    main game image display process control means for causing said environment information production means to produce the environment information within the predetermined period appearing every said update cycle, causing, every time the environment information is produced, said main game image production means to produce the main game image based on the produced environment information, and performing a main game image display process for displaying the main game image as said game image; and
    control means for selectively causing either said sub game image display process control means or said main game image display process control means to perform the process based on a predetermined condition.

2. The game device according to claim 1, wherein
    said predetermined update cycle is a cycle of a vertical blanking period, and said predetermined period is the vertical blanking period.

3. The game device according to claim 2, further comprising supervisory means for supervising a remaining time of the vertical blanking period, wherein
    when the sub game image display process is performed, said sub game image display process control means causes said environment information production means to repeatedly produce three-dimensional environment information in a continuous manner until the remaining time of said vertical blanking period supervised by said supervisory means reaches a predetermined time.

4. A game control method for causing a computer to run a game updating a game image every predetermined update cycle, wherein, in accordance with a game operation provided by a player of the game, said computer selectively performs one of the steps of
    producing environment information which is a basis for the game image of the subsequent update cycle within a predetermined period appearing every said update cycle, producing, every time the environment information is produced, a main game image based on the produced environment information, and displaying the main game image as said game image, and
    repeatedly producing the environment information which is a basis for the game image of the subsequent update cycle a plurality of times in a continuous manner within the predetermined period appearing every said update cycle, producing a sub game image based on the last produced environment information among the information produced the plurality of times, and displaying the sub game image as said game image.

5. A computer readable medium for storing a game control program to cause a computer to run a game updating a game image every predetermined update cycle, said game control program causing:
    a first procedure of producing environment information which is a basis for the game image of the subsequent update cycle within a predetermined period appearing every said update cycle, producing, every time the environment information is produced, a main game image based on the produced environment information, and displaying the main game image as said game image,
    a second procedure of repeatedly producing the environment information which is a basis for the game image of the subsequent update cycle a plurality of times in a continuous manner within the predetermined period appearing every said update cycle, producing a sub game image based on the last produced environment information among the information produced the plurality of times, and displaying the sub game image as said game image, and a control procedure of causing said computer to selectively perform one of said first and second procedures in accordance with a game operation provided by a player of the game.

* * * * *